(12) United States Patent  (10) Patent No.: US 8,630,461 B2
Miyajima et al.  (45) Date of Patent: Jan. 14, 2014

(54) VEHICLE POSITION DETECTION SYSTEM

(75) Inventors: Takayuki Miyajima, Anjo (JP); Yuusuke Morita, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 286 days.

(21) Appl. No.: 13/013,268

(22) Filed: Jan. 25, 2011

(65) Prior Publication Data

US 2011/0243379 A1  Oct. 6, 2011

(30) Foreign Application Priority Data

Mar. 31, 2010  (JP) ................................ 2010-084625

(51) Int. Cl.
*G06K 9/00*  (2006.01)
*G06K 9/70*  (2006.01)
*G01C 22/00*  (2006.01)
*G01S 19/00*  (2010.01)

(52) U.S. Cl.
USPC ........... 382/104; 382/113; 382/181; 382/209; 382/218; 382/220; 701/23; 701/28; 701/400; 701/409; 701/445; 701/446; 701/448; 701/523

(58) Field of Classification Search
USPC ................. 382/104, 113, 181, 209, 218, 220; 701/23, 28, 400, 409, 445, 446, 448, 701/523
See application file for complete search history.

(56) References Cited

U.S. PATENT DOCUMENTS

| | | | |
|---|---|---|---|
| 6,226,591 B1 * | 5/2001 | Okumura et al. | 701/409 |
| 6,343,247 B2 * | 1/2002 | Jitsukata et al. | 701/28 |
| 7,184,885 B2 | 2/2007 | Watanabe | |
| 2004/0042638 A1 * | 3/2004 | Iwano | 382/104 |
| 2006/0233424 A1 * | 10/2006 | Miyajima et al. | 382/104 |
| 2008/0273757 A1 | 11/2008 | Nakamura et al. | |
| 2010/0061591 A1 | 3/2010 | Okada et al. | |

FOREIGN PATENT DOCUMENTS

| | | |
|---|---|---|
| EP | 1 076 276 A1 | 2/2001 |
| JP | A-2004-333233 | 11/2004 |
| JP | A-2007-108043 | 4/2007 |

OTHER PUBLICATIONS

Gupta, et al., "Terrain-based vehicle orientation estimation combining vision and inertial measurements." Journal of Field Robotics. 25.3 (2008): n. page. Print.*
Wan, et al. "Automatic navigation system with multiple sensors." Computer and Computing Technologies in Agriculture. 259. (2008): 769-776. Print.*
Oct. 4, 2013 European Search Report issued in EP 11 15 2917.

* cited by examiner

*Primary Examiner* — Michael A Newman
(74) *Attorney, Agent, or Firm* — Oliff & Berridge, PLC

(57) ABSTRACT

A system stores reference data generated by associating image feature point data with an image-capturing position and a recorded vehicle event. The system generates data for matching by extracting image feature points from an actually-captured image. The system generates information on an actual vehicle event, extracts first reference data whose image-capturing position is located in a vicinity of an estimated position of the vehicle, and extracts second reference data that includes a recorded vehicle event that matches the actual vehicle event. The system performs matching between at least one of the first reference data and the second reference data, and the data for matching, and determines a position of the vehicle based on the matching.

6 Claims, 7 Drawing Sheets

FIG. 3A
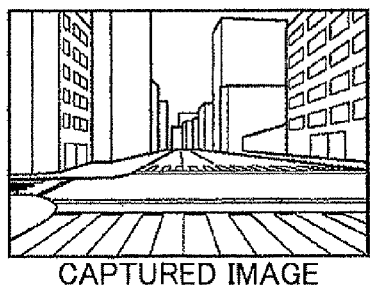
CAPTURED IMAGE
FIG. 3B
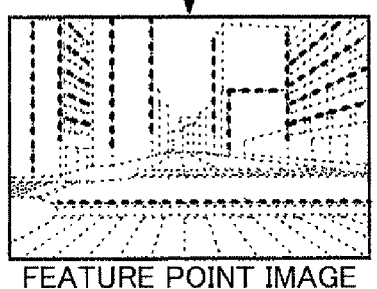
FEATURE POINT IMAGE
FIG. 3C
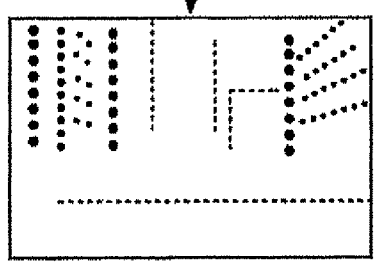
IMPORTANCE DEGREE LAYER
FIG. 3D
FEATURE POINT IMAGE IN WHICH WEIGHT COEFFICIENTS ARE ASSIGNED
FIG. 3E
ADJUSTMENT COEFFICIENT LAYER
FIG. 3F
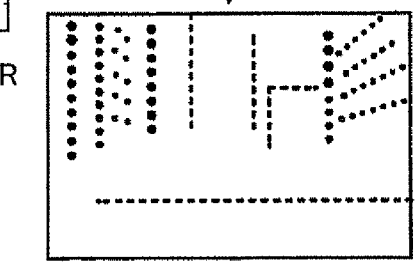
IMAGE FEATURE POINT DATA F I G . 6
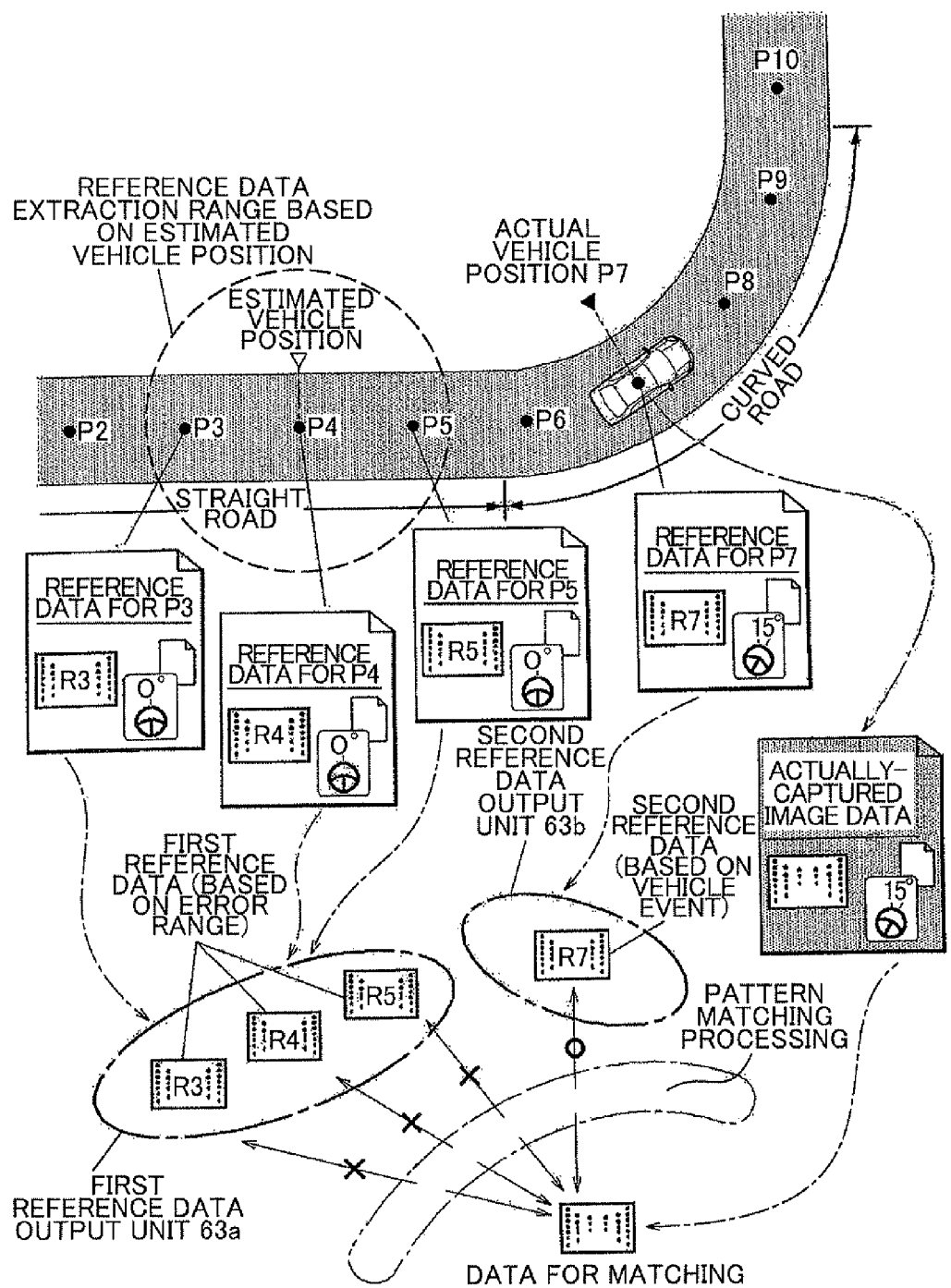

VEHICLE POSITION DETECTION SYSTEM

INCORPORATION BY REFERENCE

The disclosure of Japanese Patent Application No. 2010-084625 filed on Mar. 31, 2010 including the specification, drawings and abstract is incorporated herein by reference in its entirety.

BACKGROUND OF THE INVENTION

1. Field of the Invention

The invention relates to a vehicle position detection system that obtains a current position of a vehicle during travel, using a scenic image captured from a vehicle.

2. Description of the Related Art

In technical field of car navigation, a method in which information obtained from sensors such as a gyro sensor and a geomagnetic sensor is used (an autonomous navigation method), a method in which signals from GPS satellites are used, or the combination of the autonomous navigation method and the method in which signals from GPS satellites are used has been employed as a method of calculating the current position of a vehicle. Further, for example, a position measurement apparatus described in Japanese Patent Application Publication No. 2007-108043 (JP-A-2007-108043) is known as a position measurement apparatus configured to accurately calculate the current position (refer to the paragraphs 0009 to 0013, and FIG. 1). In the position measurement apparatus, first, a tentative current position is obtained using the signals from navigation satellites, and the like. Then, the coordinates of a feature point (a vehicle coordinate system feature point) of a road marking in a coordinate system (a vehicle coordinate system) with respect to the tentative current position are calculated using the captured image of a scene ahead of the vehicle. Then, the current position of the vehicle is calculated using the calculated vehicle coordinate system feature point and the stored coordinates of the feature point of the road marking (i.e., the coordinates shown in the world coordinate system). In the position measurement apparatus, it is possible to accurately calculate the current position, even when the position measured using the signals transmitted from the navigation satellites and/or signals transmitted from various sensors includes an error.

Also, in the technical field of car navigation, for example, in a navigation apparatus described in Japanese Patent Application Publication No. 2004-333233 (JP-A-2004-333233) (refer to paragraphs 0010 to 0043, and FIG. 1), a captured image of a building, a scene, or the like is used as a search key to retrieve at least one image with a high similarity degree from an image database, and the at least one retrieved image and corresponding location determination information are displayed to a user. When the user sees the at least one displayed image and the corresponding location determination information, the user selects the image from among the displayed image(s), and a destination is set to position information associated with the selected image. With this navigation apparatus, when a captured image obtained by capturing an image at a location is input, and search is performed, at least one image that matches the input image and the corresponding location determination information are retrieved and displayed to the user. When the user selects the image from among the displayed image(s), the destination is set to the location of the selected image. Thus, even when the user does not know the position of a location or the name of a facility to which the user wants to set the destination, the user can set the destination using the captured image obtained at the location.

SUMMARY OF THE INVENTION

In the position measurement apparatus described in Japanese Patent Application Publication No. 2007-108043 (JP-A-2007-108043), the space coordinates of the feature point of the road marking on a road are obtained using a stereo image, and the latitude and the longitude of the road marking having the feature point are obtained from the database of road marking information. Thus, the current position of the vehicle is calculated using the coordinates obtained using the latitude and the longitude of the road marking. Therefore, the position measurement apparatus cannot be used in an area where there is no road marking. Also, because it is necessary to compute the space coordinates of the feature point recognized through image processing, the apparatus is required to have high computing ability, which results in an increase in cost.

Also, when the position is determined using the captured scenic image as in the navigation apparatus described in the above-described publication No. 2004-333233, after the image that matches the input image is displayed in the navigation apparatus, the user needs to confirm the image. Therefore, it is difficult to apply this technology to the detection of a vehicle position used in car navigation.

In view of the above-described situation, it is desired to implement a vehicle position detection system that accurately and efficiently detects a vehicle position, using a scenic image recognition technology, without the need of requiring user's determination.

A first aspect of the invention relates to a vehicle position detection system that includes A vehicle position detection system comprising: a reference data database in which reference data is stored, wherein the reference data is generated by associating image feature point data generated by extracting image feature points from a captured image obtained by capturing a scene viewed from a vehicle, with an image-capturing position at which an image is captured to obtain the captured image corresponding to the image feature point data, and a recorded vehicle event that indicates a vehicle event at when the image is captured to obtain the captured image; a captured image processing unit to which an actually-captured image is input, and which outputs data for matching generated by extracting image feature points from the actually-captured image, wherein the actually-captured image is obtained by capturing an image of a scene using a vehicle-mounted camera; a vehicle event evaluation unit that generates information on an actual vehicle event that is a vehicle event detected by the vehicle; a first reference data output unit that extracts first reference data whose image-capturing position is located in a vicinity of an estimated position of the vehicle, from among a set of the reference data stored in the reference data database, based on the estimated position of the vehicle, and outputs the extracted first reference data as a matching candidate for the data for matching; a second reference data output unit that extracts second reference data that includes the recorded vehicle event that matches the actual vehicle event, from among the set of the reference data stored in the reference data database, based on the vehicle event, and outputs the extracted second reference data as the matching candidate for the data for matching; a matching performing unit that performs matching between at least one of the first reference data and the second reference data, and the data for matching; and a vehicle position determination unit that determines a position of the vehicle, based on the image-capturing position associated with the reference data that matches the data for matching.

In the above-described configuration, the role of extracting the reference data that serve as the matching candidates for the data for matching is divided between the first reference data output unit and the second reference data output unit. That is, the first reference data output unit extracts the reference data (the first reference data) whose image-capturing position is located in the vicinity of the estimated vehicle position. The second reference data output unit extracts the reference data, using the vehicle event as the search condition. Thus, even if the reference data whose image-capturing position is located in the vicinity of the estimated vehicle position does not match the data for matching, the reference data is extracted using the vehicle event that is the search condition different from the position. Therefore, the matching is efficiently performed.

BRIEF DESCRIPTION OF THE DRAWINGS

The foregoing and further objects, features and advantages of the invention will become apparent from the following description of example embodiments with reference to the accompanying drawings, wherein like numerals are used to represent like elements and wherein:

FIGS. 3A to 3F are schematic diagrams schematically showing adjustment of weight coefficients using adjustment coefficients;

FIG. 6 is a schematic diagram used for explaining that the reference data, whose image-capturing position is not included in the error range, is extracted based on the vehicle event when the vehicle is traveling on a curved road.

DETAILED DESCRIPTION OF EMBODIMENTS

Figure 1:
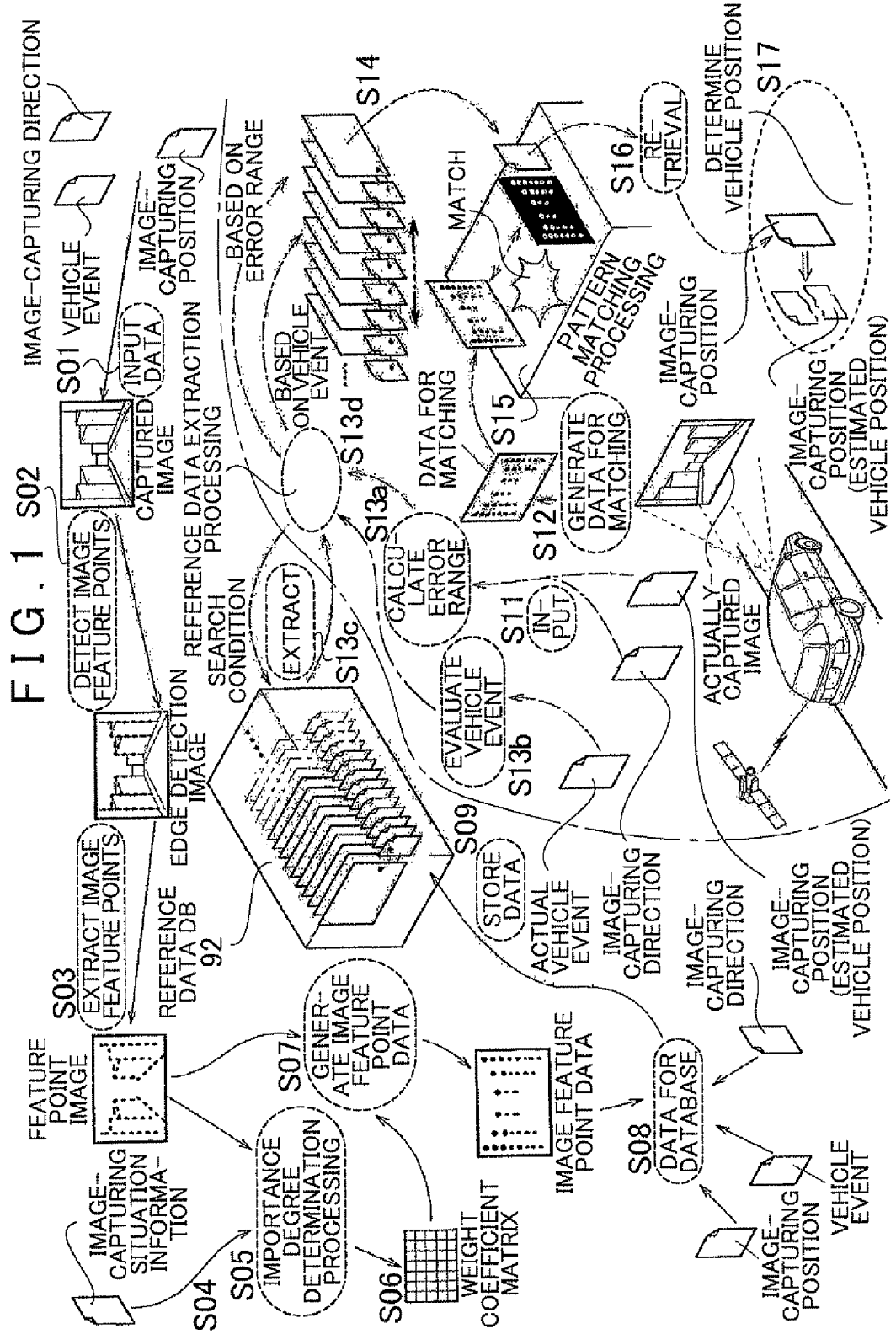
FIG. 1 is a schematic diagram used for explaining the basic concept of a vehicle position detection technology in a vehicle position detection system that uses scenic image recognition, according to an embodiment of the invention.

Hereinafter, an embodiment of the invention will be described in detail with reference to the drawings. FIG. 1 schematically shows the basic concept of a position measurement technology in which image recognition is performed on a scenic image captured by a vehicle-mounted camera disposed to capture an image ahead of a vehicle, through matching processing using reference data created by an image processing system according to the embodiment of the invention, so that a position at which the scenic image is captured, that is, a vehicle position is determined.

First, a procedure for creating a reference data database (hereinafter, simply referred to as "reference data DB") 92 will be described. As shown in FIG. 1, a captured image obtained by capturing an image of a scene viewed from a vehicle during travel, image-capturing attribute information, and an event value in a vehicle event are input (step 01). The image-capturing attribute information includes an image-capturing position of the captured image, and an image-capturing direction of the captured image at the time of image capturing. The term "an image-capturing position of the captured image" signifies a position at which the image is captured to obtain the captured image. The term "an image-capturing direction of the captured image" signifies a direction in which the image is captured to obtain the captured image. The vehicle event is an event that occurs in the vehicle at the time of image capturing (for example, temporary stop or traveling on a curved road). Then, feature point detection processing for detecting image feature points, for example, edge detection processing is performed on the input captured image (step 02). A portion, at which edge points corresponding to one or more pixels constitute one line segment, for example, an outline, is referred to as "a line segment edge". An intersection point, at which a plurality of the line segment edges intersect with each other, is referred to as "a corner". The edge points, which constitute the line segment edge, are referred to as "line segment edge points". Among the line segment edge points, the edge point corresponding to the corner is referred to as "a corner edge point". The line segment edge points and the corner edge point are examples of the image feature point. The line segment edge points including the corner edge point are extracted, as the image feature points, from an edge detection image obtained through the edge detection processing (step 03).

Taking into account that the image feature points are used for scenic image recognition, all the extracted image feature points do not necessarily have the same importance degree. For example, the importance degree of each image feature point may depend on the position coordinate of the image feature point in the captured image. Therefore, it is preferable to determine the importance degrees of the image feature points by applying a rule of decreasing the importance degree of the image feature point that is not suitable for the scenic image recognition, and/or increasing the importance degree of the image feature point that is importance for the scenic image recognition (step 04). After the importance of each image feature point is determined, a weight coefficient matrix is generated (step 05). The weight coefficient matrix stipulates the assignment of the weight coefficients to the image feature points in accordance with the importance degrees of the image feature points.

Subsequently, image feature point data for each captured image is generated by performing processing on the image feature points using the weight coefficient matrix (step 07). During the process of creating the image feature point data, selection processing is performed. That is, the image feature points with the weight coefficients equal to or lower than a first threshold value are discarded, and/or the image feature points are discarded except the image feature points with the weight coefficients equal to or higher than a second threshold value and the image feature points around the image feature points with the weight coefficients equal to or higher than the second threshold value. When pattern matching is employed for the scenic image recognition, the image feature point data generated in this step is used as the pattern. Therefore, in order to achieve the high-speed performance and high accuracy of the matching, it is important that the image feature point data should include only the image feature points useful for the pattern matching for the scenic image. The generated image feature point data is associated with the image-capturing position and/or the image-capturing direction of the captured image corresponding to the image feature point data, and the vehicle event. Thus, the generated image feature point data becomes data for a database that is searchable using the image-capturing position and/or the image-capturing direction, and the vehicle event as search conditions (step 08). That is, the image feature point data is stored in the reference data DB 92 as a part of the reference data used for the scenic image recognition, that is, as the data to be extracted as a matching candidate (step 09).

Next, a procedure for determining the position of the vehicle (vehicle position) while the vehicle is actually traveling using the reference data DB 92 created by the above-described procedure will be described. As shown in FIG. 1, an estimated vehicle position that is estimated using, for example, a GPS measurement unit, an actually-captured image obtained by capturing an image using the vehicle-mounted camera whose image-capturing position is the estimated vehicle position, the image-capturing direction thereof, and vehicle event data are input (step 11). An actual vehicle event at the time of image capturing is recorded in the vehicle event data. Data for matching, which is the image feature point data, is generated from the input captured image, through the step 02 to the step 07 described above (step 12).

An estimated error range (hereinafter, simply referred to as "error range"), which is defined based on an error in the estimated vehicle position that is the input image-capturing position, is calculated (step 13a). Further, the input vehicle event data is evaluated, and thus, information on an actual vehicle event (hereinafter, referred to as "actual vehicle event information") is generated (step 13b). The actual vehicle event information includes an event that can be used as a search condition for searching the reference data DB 92. Then, the reference data suitable as the matching candidates for the data for matching are extracted from the reference data DB 92 based on the error range and the actual vehicle event (step 13c). Thus, the reference data based on the error range, and the reference data based on the vehicle event are output (step 13d). A set of the output reference data (i.e., a matching candidate reference dataset) is prepared for matching processing that is the scenic image recognition (step 14).

Each reference data included in the extracted matching candidate reference dataset is set as the pattern, and the processing of pattern matching between each pattern and the generated data for matching is performed as the scenic image recognition (step 15). When the reference data, which is set as the pattern, matches the generated data for matching, the image-capturing position associated with the reference data that matches the generated data for matching is retrieved (step 16). The retrieved image-capturing position is determined to be a formal vehicle position, instead of the estimated vehicle position (step 17).

Figure 2:
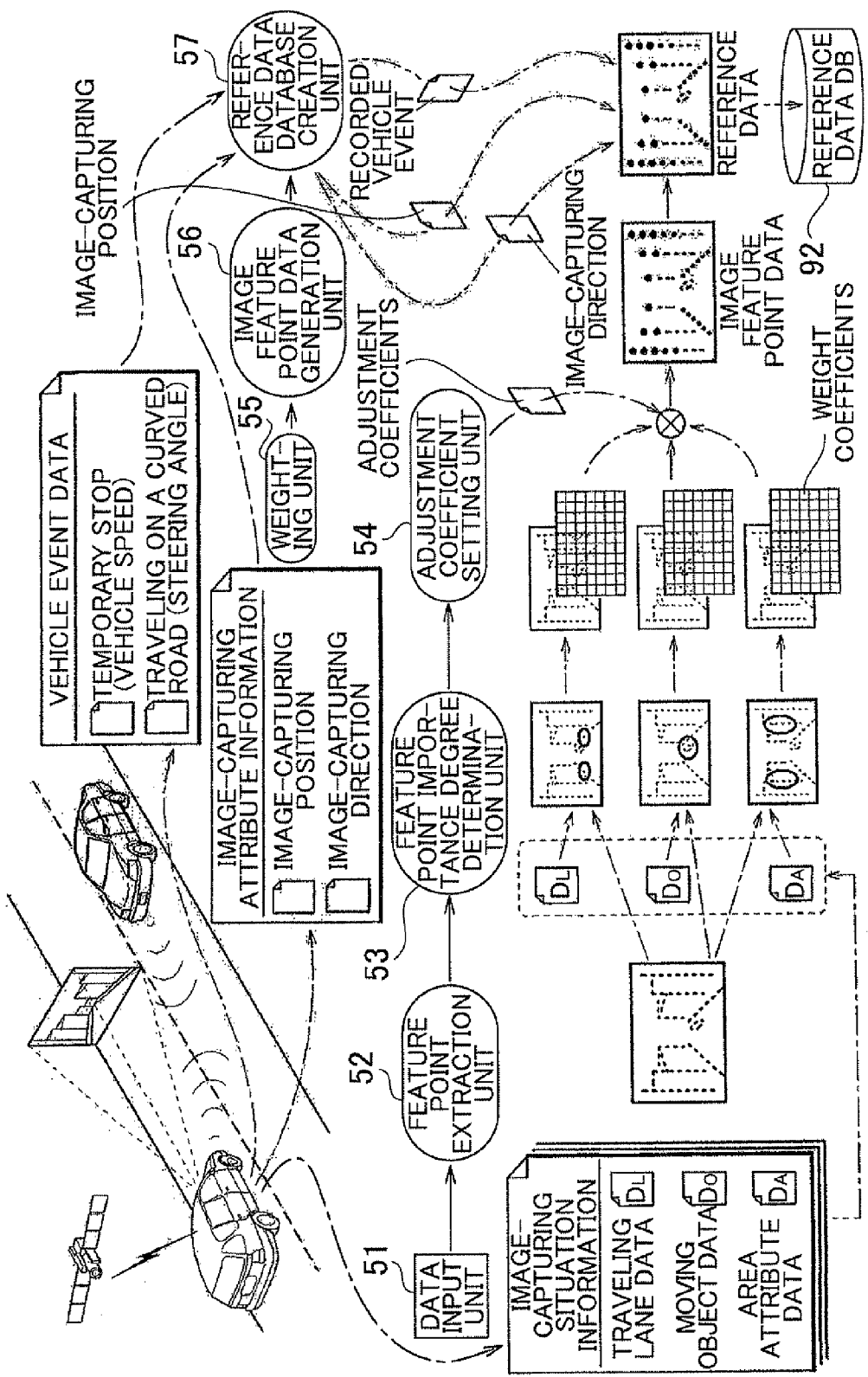
FIG. 2 is a functional block diagram showing main functions of an image processing system that generates reference data used in the vehicle position detection system according to the embodiment of the invention.

Next, an example of the image processing system, which generates the reference data to be used in the above-described vehicle position detection system, from the captured image obtained by capturing an image of a scene viewed from the vehicle, will be described. FIG. 2 schematically shows functions of the image processing system.

The image processing system includes functional units, such as a data input unit 51, a feature point extraction unit 52, a feature point importance degree determination unit 53, a weighting unit 55, an adjustment coefficient setting unit 54, an image feature point data generation unit 56, and a reference data database creation unit 57. Each of the functions may be implemented by hardware, software, or combination of hardware and software.

The captured image obtained by capturing an image of a scene using the camera provided in a vehicle, the image-capturing attribute information including the image-capturing position and the image-capturing direction at the time of image capturing, image-capturing situation information, and image-capturing situation information are input to the data input unit 51, as image-capturing related information. The vehicle may be a vehicle that is traveling for the purpose of creating the reference data. Further, the vehicle event data that shows the event value in a specific vehicle event at the time of image capturing is input to the data input unit 51. Examples of the event value in the specific vehicle event included in the vehicle event data include a vehicle speed when the vehicle temporarily stops, a steering angle when the vehicle is traveling on a curved road, and the inclination of the vehicle in a longitudinal direction thereof when the vehicle is traveling on a slope road (that is, the inclination of a road). In an example in which the image processing system is provided in the vehicle, the captured image, the image-capturing attribute information, the image-capturing situation information, and the vehicle event data are input to the data input unit 51 in real time. However, in an example in which the image processing system is installed in a data processing center or the like, the captured image, the image-capturing attribute information, the image-capturing situation information, and the vehicle event data are temporarily stored in a storage medium, and these data are input to the data input unit 51 in a batch processing manner. Methods of generating the captured image, the image-capturing attribute information, and the vehicle event data are known, and therefore, the description thereof is omitted.

The image-capturing situation information is information indicating the possibility that a specific subject is included in the captured image. Examples of the specific subject include objects that define a traveling lane in which the vehicle travels, such as a guide rail and a groove at a road shoulder, moving objects such as a nearby traveling vehicle, an oncoming vehicle, a bicycle, and a pedestrian, and scenic objects that are the features of a mountainous area, a suburban area, an urban area, a high-rise building area, and the like, such as a mountain and a building. In the embodiment, the contents of the image-capturing situation information include traveling lane data $D_L$, moving object data $D_O$, and area attribute data $D_A$. The traveling lane data $D_L$ is data that shows a region of the traveling lane, and a region outside a road, in the captured image. The traveling lane data $D_L$ is obtained based on the result of recognition of white lines, a guide rail, and a safety zone. The white lines, the guide rail, and the safety zone are recognized through the image processing performed on the captured image. The moving object data $D_O$ is data that shows a region where a moving object near the vehicle exists in the captured image. The moving object near the vehicle is recognized by a vehicle-mounted sensor that detects an obstacle, such as a radar. The area attribute data $D_A$ is data that shows the type of an image-capturing area in which the captured image is obtained by capturing the image, that is, an area attribute of the image-capturing area. Examples of the area attribute include a mountainous area, a suburban area, an urban area, and a high-rise building area. The type, that is, the area attribute of the image-capturing area is recognized based on the vehicle position when the captured image is obtained by capturing the image, and map data.

The feature point extraction unit 52 extracts the edge points from the captured image, as the image feature points, using an appropriate operator. The feature point importance degree determination unit 53 determines the importance degrees of the image feature points extracted by the feature point extraction unit 52, based on the contents of each data included in the image-capturing situation information. For example, when the contents of the traveling lane data $D_L$ are used, a high importance degree is assigned to the image feature point in a road shoulder-side region outside the traveling lane in the captured image, as compared to an importance degree assigned to the image feature point in a region inside the traveling lane in the captured image. When the moving object data $D_O$ is used, a low importance degree is assigned to the image feature point in a region where a moving object exists in the captured image, as compared to an importance degree assigned to the image feature point in a region where the moving object does not exist in the captured image. Further, when the contents of the area attribute data $D_A$ are used, a rule for assigning the importance degrees to the image feature points in accordance with the positions of the image feature points in the captured image is changed in accordance with the above-described area attribute. For example, in the captured image of a mountainous area, because there is a high possibility that there is sky above a central optical axis for image capturing, and there are woods on the right and left sides of the central optical axis for image capturing, a high importance degree is assigned to the image feature point in a center region around the central optical axis for image capturing, as compared to an importance degree assigned to the image feature point in a region other than the central region. In the captured image of a suburban area, because there is not much traffic, and there are structural objects such as houses around, a high importance degree is assigned to the image feature point in a region below the central optical axis for image capturing, as compared to an importance degree assigned to the image feature point in a region above the central optical axis for image capturing. In the captured image of an urban area, because there is much traffic, a high importance degree is assigned to the image feature point in a region above the central optical axis for image capturing, as compared to a region below the central optical axis for image capturing. In the captured image of a high-rise building area, because there are many elevated roads and elevated bridges, a high importance degree is assigned to the image feature point in a region above the central optical axis for image capturing, as compared to a region below the central optical axis for image capturing.

The weighting unit 55 assigns weight coefficients to the image feature points in accordance with the importance degrees assigned by the feature point importance degree determination unit 53. Because a high importance degree is assigned to the image feature point that is considered to be important for performing accurate image recognition (accurate pattern matching), a high weight coefficient is assigned to the image feature point to which a high importance degree has been assigned. On the other hand, taking into account that there is a high possibility that the image feature point, to which a low importance degree has been assigned, is not used for the actual image recognition, or is deleted from the reference data, a low weight coefficient is assigned to the image feature point to which a low importance degree has been assigned so that the low weight coefficient is used for determining whether to select or delete the image feature point.

The adjustment coefficient setting unit 54 calculates adjustment coefficients used for changing the weight coefficients assigned by the weighting unit 55, in view of the distribution state of the weight coefficients in the captured image. The importance degrees, which have been assigned to the image feature points extracted by the feature point extraction unit 52 based on the image-capturing situation information, include certain errors. As a result, there is considered to be a possibility that the image feature points, to which high importance degrees have been assigned, are randomly distributed. Therefore, when the image feature points to which high importance degrees have been assigned are unevenly distributed, in other words, when the image feature points to which high weight coefficients have been assigned by the weighting unit 55 are unevenly distributed, the adjustment coefficient setting unit 54 is used to make the distribution less uneven. When the dispersion of the image feature points obtained through the computation processing indicates that the image feature points to which the high weight coefficients have been assigned are unevenly distributed, the adjustment coefficient is set to increase the weight coefficient(s) of the image feature points in a region where the density of the image feature points to which the high weight coefficients have been assigned is low, and the adjustment coefficient is set to decrease the weight coefficient(s) of the image feature points in a region where the density of the image feature points to which the high weight coefficients have been assigned is high.

The image feature point data generation unit 56 generates the image feature point data for each captured imaged, by performing processing on the image feature points based on the weight coefficients assigned by the weighting unit 55, or based on the weight coefficients and the assigned adjustment coefficients in some cases. When generating the image feature point data, the number of the image feature points may be reduced to efficiently perform the matching processing, by deleting the image feature points with the weighting coefficients equal to or lower than a threshold value. Also, the image feature point data may be provided with the weight coefficients so that the weight coefficients are associated with the image feature points in the reference data as well, and the weight coefficients are used for calculating weighted similarity when the pattern matching processing is performed.

The processing of distributing the image feature points in the image feature point data over an entire region of the captured image as widely as possible using the above-described adjustment coefficients will be described with reference to a schematic explanatory diagram shown in FIGS. 3A to 3F. A feature point image (FIG. 3B) is generated by extracting the image feature points from the captured image (FIG. 3A). The importance degree is assigned to each image feature point in the feature point image. FIG. 3C shows the importance degrees corresponding to the image feature points in the form of an importance degree layer corresponding to the feature point image, in order to make it possible to schematically understand how the importance degrees are assigned. The weighting coefficient is assigned to each image feature point using the importance degree layer. FIG. 3D shows the image feature points to which the weight coefficients have been assigned, in the form of the feature point image in which the size of the image feature point increases as the weight coefficient of the image feature point increases. If processing is performed on the image feature points, for example, to delete the image feature points to which the weight coefficients equal to or lower than the threshold value have been assigned, that is, for example, if the image feature points other than the large-sized image feature points in FIG. 3D are deleted, the image feature points located in a lower region in the feature point image are removed. As a result, the remaining image feature points (that is, the image feature points in the image feature point data) may be extremely unevenly distributed. In order to avoid the uneven distribution of the image feature points, the degree of distribution of the image feature points in the feature point image is calculated, and the adjustment coefficients are set to increase the weight coefficient(s) of the image feature points in a region where the density of the remaining image feature points is low as a result of performing processing on the image feature points. In order to make it possible to schematically understand the adjustment coefficients that are set in the above-described manner, FIG. 3E shows groups of the adjustment coefficients in the form of an adjustment coefficient layer corresponding to the feature point image. In the adjustment coefficient layer, the adjustment coefficients are arranged in a matrix manner (i.e., the adjustment coefficient is assigned to each section composed of a plurality of pixel regions). The image feature point data generation unit 56 performs processing on the image feature points using the weight coefficients and the weight coefficients that are finally set based on the adjustment coefficients, thereby generating the image feature point data shown in FIG. 3F for each captured image.

The reference data database creation unit 57 creates the reference data that is used for the scenic image recognition by associating the image feature point data generated by the image feature point data generation unit 56 with the image-capturing attribute information regarding the captured image corresponding to the image feature point data, and creates the database of the reference data. At this time, in order to assist the scenic image recognition, information showing the vehicle event at the time of image capturing is taken out from the vehicle event data as the recorded vehicle event, and the information is also associated with the reference data. The reference data is stored in the reference data DB 92.

The example, in which the importance degree of each image feature point is determined, and as a result, the weight coefficient of each image feature point is set, has been described above. However, the processing may be performed for each image feature point group. In this case, for example, the region of the captured image may be divided into a plurality of image sections, and the feature point importance degree determination unit 53 may divide the image feature points into image feature point groups so that each image feature point group includes the image feature points in the same image section, and may perform the processing for each image feature point group. In this case, the feature point importance degree determination unit 53 may assign the same importance degree to the image feature points included in the same image feature point group. Similarly, the weighting unit 55 may set the weight coefficient for each image feature point group. In this case, the image sections may be set in a manner such that each image section is composed of one pixel included in the captured image, or each image section is composed of a plurality of pixels. Thus, in the embodiment of the invention, each image section may be composed of one or more pixels.

Figure 4:
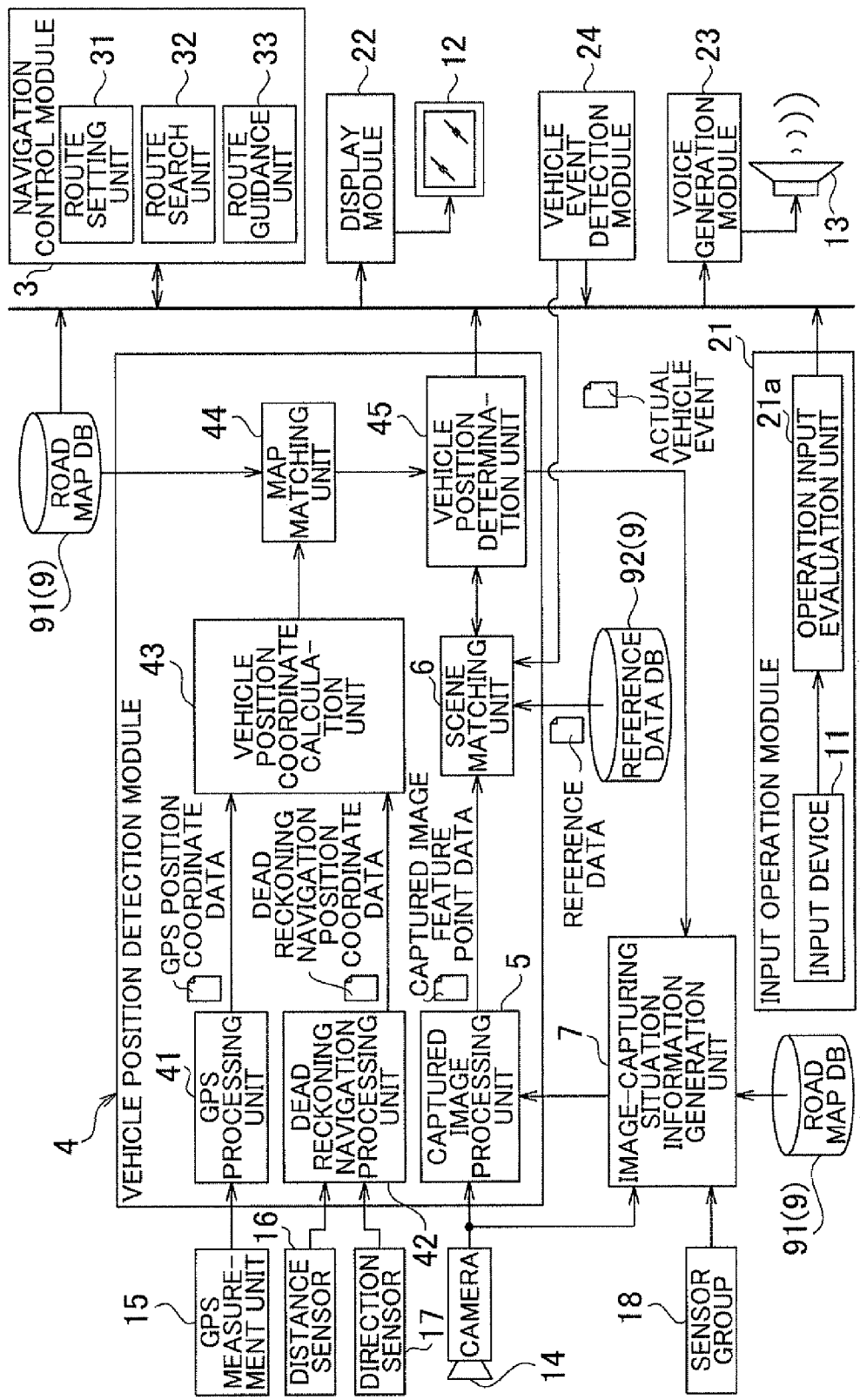
FIG. 4 is a functional block diagram showing functions of a car navigation system that employs the vehicle position detection system according to the embodiment of the invention.

Next, a vehicle-mounted car navigation system, which corrects the vehicle position by performing the scenic image recognition (the image feature point pattern matching) based on the basic concept of the above-described vehicle position detection system, using the reference data DB 92 created by the above-described image processing system, will be described. FIG. 4 shows functional blocks in an example in which the car navigation system is installed in a vehicle-mounted LAN. The car navigation system includes an input operation module 21, a navigation control module 3, a vehicle position detection module 4, an image-capturing situation information generation unit 7, a database 9 including the above-described reference data DB 92 and a road map database (hereinafter, simply referred to as "road map DB") 91 in which road map data for car navigation is stored, and a vehicle event detection module 24. The vehicle event detection module 24 has a function of receiving sensor signals and control signals that show various behaviors of the vehicle, such as a braking behavior, an accelerating behavior, and a steering behavior, through a vehicle-mounted LAN, and generating and outputting vehicle event data including various vehicle events.

The navigation control module 3 includes a route setting unit 31, a route search unit 32, and a route guidance unit 33. For example, the route setting unit 31 sets a departure point such as the current vehicle position, a destination that has been input, and pass-through points, and a traveling condition (for example, a condition as to whether an expressway is to be used). The route search unit 32 is a processing unit that performs computation processing for searching for a guidance route from the departure point to the destination based on the condition set by the route setting unit 31. The route guidance unit 33 is a processing unit that performs computation processing for providing appropriate route guidance to a driver in accordance with the route from the departure point to the destination, which is retrieved by the route search unit 32 as a result of searching. The route guidance unit 33 provides the route guidance, using guidance displayed on the screen of a monitor 12, voice guidance output from a speaker 13, and the like.

The vehicle position detection module 4 has a function of correcting the estimated vehicle position obtained by performing conventional position calculation using the GPS and performing conventional position calculation using dead reckoning navigation. The vehicle position detection module 4 corrects the estimated vehicle position based on the vehicle position determined by the scenic image recognition using the estimated vehicle position. The vehicle position detection module 4 includes a GPS processing unit 41, a dead reckoning navigation processing unit 42, a vehicle position coordinate calculation unit 43, a map matching unit 44, a vehicle position determination unit 45, a captured image processing unit 5, and a scene matching unit 6. The GPS processing unit 41 is connected to a GPS measurement unit 15 that receives GPS signals from GPS satellites. The GPS processing unit 41 analyzes the signals from the GPS satellites received by the GPS measurement unit 15, calculates the current position of the vehicle (i.e., the latitude and the longitude), and transmits the current position of the vehicle to the vehicle position coordinate calculation unit 43 as GPS position coordinate data. The dead reckoning navigation processing unit 42 is connected to a distance sensor 16 and a direction sensor 17. The distance sensor 16 is a sensor that detects the speed and the moving distance of the vehicle. For example, the distance sensor 16 includes a vehicle speed pulse sensor that outputs a pulse signal each time the drive shaft, the wheel, or the like of the vehicle rotates by a certain amount, a yaw rate/acceleration sensor that detects the acceleration of the vehicle, and a circuit that integrates the detected values of the acceleration. The distance sensor 16 outputs information on the speed of the vehicle and information on the moving distance of the vehicle, which are the results of detection, to the dead reckoning navigation processing unit 42. For example, the direction sensor 17 includes a gyro sensor, a geomagnetic sensor, an optical rotation sensor and a rotary variable resistor that are attached to the rotational unit of a steering wheel, and an angle sensor attached to a wheel unit. The direction sensor 17 outputs information on the direction, which is the result of detection, to the dead reckoning navigation processing unit 42. The dead reckoning navigation processing unit 42 computes dead reckoning navigation position coordinates based on the moving distance information and the direction information, which are transmitted to the dead reckoning navigation processing unit 42 at every moment, and transmits the computed dead reckoning navigation position coordinates to the vehicle position coordinate calculation unit 43 as the dead reckoning navigation position coordinate data. The vehicle position coordinate calculation unit 43 performs computation processing to determine the coordinates of the vehicle position based on the GPS position coordinate data and the dead reckoning navigation position coordinate data, using a known method. The calculated vehicle position information includes a measurement error and the like. Therefore, the calculated vehicle position may deviate from a road in some cases. Thus, the map matching unit 44 adjusts the vehicle position information so that the vehicle is positioned on a road shown in the road map. The coordinates of the vehicle position are transmitted to the vehicle position determination unit 45 as the estimated vehicle position.

The captured image processing unit 5 substantially includes most of functional units that constitute the image processing system shown in FIG. 2. The captured image processing unit 5 includes the data input unit 51, the feature point extraction unit 52, the feature point importance degree determination unit 53, the weighting unit 55, the adjustment coefficient setting unit 54, and the image feature point data generation unit 56. When the captured image of a scene ahead of the vehicle, which is the image captured by the vehicle-mounted camera 14, is input to the data input unit 51, the image feature point data is output from the image feature point data generation unit 56 through the above-described steps. The image-capturing situation information used by the feature point importance degree determination unit 53 is generated by the image-capturing situation information generation unit 7 provided in the vehicle, and transmitted to the captured image processing unit 5. The image-capturing situation information generation unit 7 is connected to the vehicle-mounted camera 14 in order to generate the above-described traveling lane data $D_L$, and the image-capturing situation information generation unit 7 receives the captured image that is the same as the captured image transmitted to the captured image processing unit 5. The traveling lane data $D_L$ is created by performing image processing on the received captured image, using a known algorithm. The image-capturing situation information generation unit 7 is connected to a sensor group 18 for detecting an obstacle, in order to create the above-described moving object data $D_O$. The image-capturing situation information generation unit 7 creates the moving object data $D_O$ based on sensor information transmitted from the sensor group 18. Further, the image-capturing situation information generation unit 7 is connected to the vehicle position determination unit 45 and the database 9, in order to create the above-described area attribute data $D_A$. The image-capturing situation information generation unit 7 obtains the area attribute of an area where the vehicle is currently traveling, by searching the database 9 using the coordinates of the vehicle position transmitted from the vehicle position determination unit 45 as a search condition. Examples of the area attribute include a mountainous area and an urban area. The image-capturing situation information generation unit 7 creates the area attribute data $D_A$ based on the obtained area attribute.

The scene matching unit 6 extracts a reference dataset according to an extraction algorithm described in detail later, from the reference data DB 92, based on the estimated vehicle position transmitted from the vehicle position determination unit 45, and the actual vehicle event transmitted from the vehicle event detection module 24. Further, while the scene matching unit 6 sequentially sets each reference data included in the extracted reference dataset as the pattern for the pattern matching, the scene matching unit 6 performs the pattern matching processing on the data for matching that is the image feature point data transmitted from the captured image processing unit 5. When the reference data matches the data for matching, the image-capturing position associated with the reference data that matches the data for matching is retrieved. The retrieved image-capturing position is transmitted to the vehicle position determination unit 45, as the vehicle position. The vehicle position determination unit 45 corrects the vehicle position, that is, replaces the estimated vehicle position with the transmitted vehicle position.

The car navigation system further includes, as peripheral devices, an input operation module 21, a display module 22, and a voice generation module 23. The input operation module 21 includes an input device 11 including a touch panel and a switch; and an operation input evaluation unit 21a that transforms an operation input through the input device 11 to an appropriate operation signal, and transmits the operation signal to the car navigation system. The display module 22 causes the monitor 12 to display image information necessary for car navigation. The voice generation module 23 causes the speaker 13 and a buzzer to output voice information necessary for car navigation.

Next, a relation between extraction of first reference data and extraction of second reference data, which are performed by the scene matching unit 6, will be described with reference to schematic diagrams in FIG. 5 and FIG. 6. The first reference data is a group of the reference data whose image-capturing positions are included in the error range whose center is the estimated vehicle position. The second reference data is a group of the reference data (or only one reference data) which is(are) extracted based on the actual vehicle event transmitted from the vehicle event detection module 24. Although the image-capturing position(s) of the second reference data is(are) located outside the error range, the second reference data is(are) useful as the matching candidate(s).

When an error in the vehicle position exceeds an error estimated for calculating the error range, the actual vehicle position is not included in the error range. In this case, it is conceivable to perform the matching processing as the scenic image recognition, while gradually expanding the estimated error range. However, it may take time to perform the matching processing, or it may become impossible to perform the matching processing.

Figure 5:
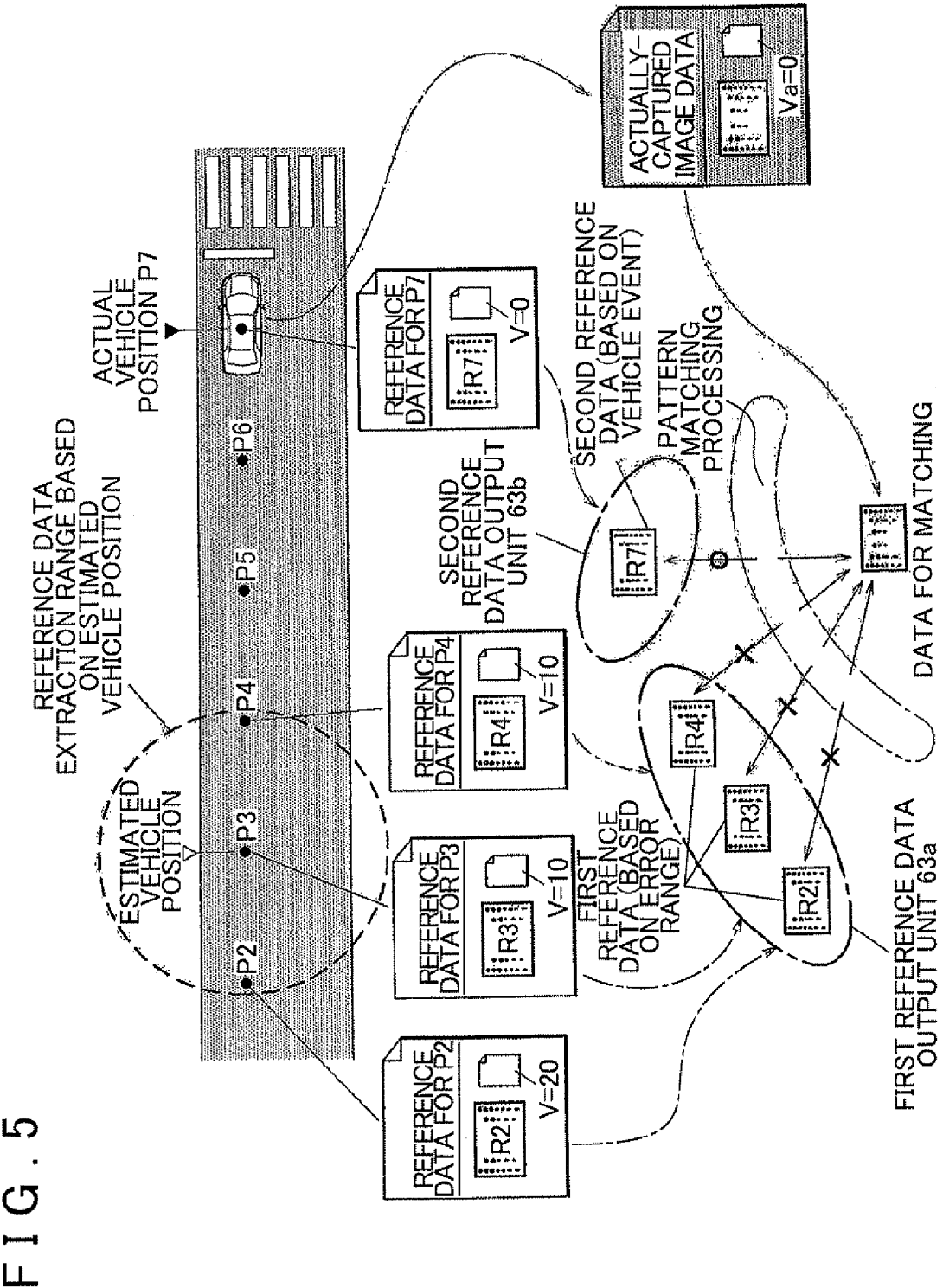
FIG. 5 is a schematic diagram used for schematically explaining that the reference data, whose image-capturing position is not included in an error range, is extracted based on a vehicle event when a vehicle is temporarily stopped.

FIG. 5 is a schematic diagram used for explaining that the reference data, whose image-capturing position is not included in the error range, is extracted based on the vehicle event when the vehicle is temporarily stopped. In FIG. 5, the estimated vehicle position is shown as a reference point P3, and image-capturing positions of the reference data, which are located ahead of the reference point P3 in a vehicle traveling direction in which the vehicle travels, are shown as image-capturing positions P4, P5, P6, and P7 in the stated order in a direction away from the estimated vehicle position. An image-capturing position of the reference data, which is located behind the reference point P3 in the vehicle traveling direction, is shown as an image-capturing position P2. The error range, whose center is the reference point P3, and which is calculated based on the measurement error in the vehicle position, is shown by a dotted line. In the example, the reference point P3, and the image-capturing positions P2 and P4 are included in the error range. The term "image-capturing position" signifies the image-capturing position of the reference data stored in the reference data DB 92. Reference data R2, R3, and R4 (the first reference data) whose image-capturing positions are included in the error range may be extracted by searching the reference data DB 92 using the error range as the search condition. Further, a vehicle speed V (expressed in terms of km/h) at each image-capturing position is schematically shown. The vehicle speed is the event value in the recorded vehicle event (i.e., temporary stop in this example), which is associated with the reference data for the image-capturing position. The vehicle speed V at the reference point P3 is 10 km/h, the vehicle speed V at the image-capturing position P2 is 20 km/h, the vehicle speed V at the image-capturing position P4 is 10 km/h, and the vehicle speed at the image-capturing position P7 is 0 km/h. In the example shown in FIG. 5, an actual vehicle position, at which the vehicle is actually located, is the image-capturing position P7. At this position, the vehicle is temporarily stopped (that is, an actual vehicle speed Va is 0 km/h). In this situation, reference data R7 (the second reference data) at the image-capturing position P7 is extracted as the matching candidate, by further searching the reference data DB 92 using the actual vehicle event as the search condition. When the actual vehicle event is used as the search condition, a range determined based on the error range, for example, a range that is twice as large as a range over which the vehicle has traveled may be employed as a reference data extraction range that is an extraction condition for extracting the reference data from the reference data DB 92. In this case, it is possible to reduce the possibility that useless data is extracted, by limiting the reference data extraction range with respect to the estimated vehicle position, using a predetermined threshold value.

Because the actual vehicle position, at which the vehicle is actually located, is the image-capturing position P7 in the example shown in FIG. 5, the actually-captured image is the captured image obtained by capturing the image at the image-capturing position P7, and thus, the event value in the actual vehicle event, that is, the vehicle speed is 0 km/h. As shown in FIG. 5, the estimated vehicle position deviates from the actual vehicle position to a large extent. Therefore, when the matching is performed between the first reference data extracted using the error range as the search condition and the data for matching generated from the actually-captured image, no first reference data matches the data for matching. In contrast, although the second reference data extracted using the actual vehicle event as the search condition is the reference data whose image-capturing position P7 is greatly distant from the error range, the second reference data matches the data for matching. Thus, it is possible to correct the estimated vehicle position, that is, to replace the estimated vehicle position with the more accurate vehicle position.

FIG. 6 is a schematic diagram used for explaining that the reference data, whose image-capturing position is not included in the error range, is extracted based on the vehicle event when the vehicle is traveling on a curved road. In FIG. 6, the estimated vehicle position is shown as a reference point P4, and image-capturing positions of the reference data, which are located ahead of the reference point P4 in the vehicle traveling direction, are shown as image-capturing positions P5 to P10 in the stated order in a direction away from the estimated vehicle position. Image-capturing positions of the reference data, which are located behind the reference point P4 in the vehicle traveling direction, are shown as image-capturing positions P3 and P2 in the stated order in a direction away from the estimated vehicle position. The error range, whose center is the reference point P4, and which is calculated based on the measurement error in the vehicle position, is shown by a dotted line in FIG. 6 as well. In the example, the reference point P4 and the image-capturing positions P3 and P5 are included in the error range. Reference data R3, R4, and R5 (the first reference data) whose image-capturing positions are included in the error range may be extracted by searching the reference data DB 92 using the error range as the search condition. Further, a steering angle at each image-capturing position is schematically shown. The steering angle is the event value in the recorded vehicle event (i.e., traveling on a curved road), which is associated with the reference data for the image-capturing position. The steering angle at the reference point P4 is 0°, the steering angle at the image-capturing position P3 is 0°, the steering angle at the image-capturing position P5 is 0°, and the steering angle at the image-capturing position P7 is 15°. In the example shown in FIG. 6 as well, the actual vehicle position, at which the vehicle is actually located, is the image-capturing position P7. At this position, the vehicle is actually traveling on the curved road at the steering angle of 15°. In this situation as well, the reference data R7 (the second reference data) for the image-capturing position P7 is extracted as the matching candidate, by further searching the reference data DB 92 using the actual vehicle event as the search condition. Because the actual vehicle position, at which the vehicle is actually located, is the image-capturing position P7 in the example shown in FIG. 6, the actually-captured image is the captured image obtained by capturing the image at the image-capturing position P7, and thus, the event value in the actual vehicle event, that is, the steering angle is 15°. As shown in FIG. 6, the estimated vehicle position deviates from the actual vehicle position to a large extent. Therefore, when the matching is performed between the first reference data extracted using the error range as the search condition and the data for matching generated from the actually-captured image, no first reference data matches the data for matching. In contrast, although the second reference data extracted using the actual vehicle event as the search condition is the reference data whose image-capturing position P7 is greatly distant from the error range, the second reference data matches the data for matching. Thus, it is possible to correct the estimated vehicle position, that is, to replace the estimated vehicle position with the more accurate vehicle position.

Figure 7:
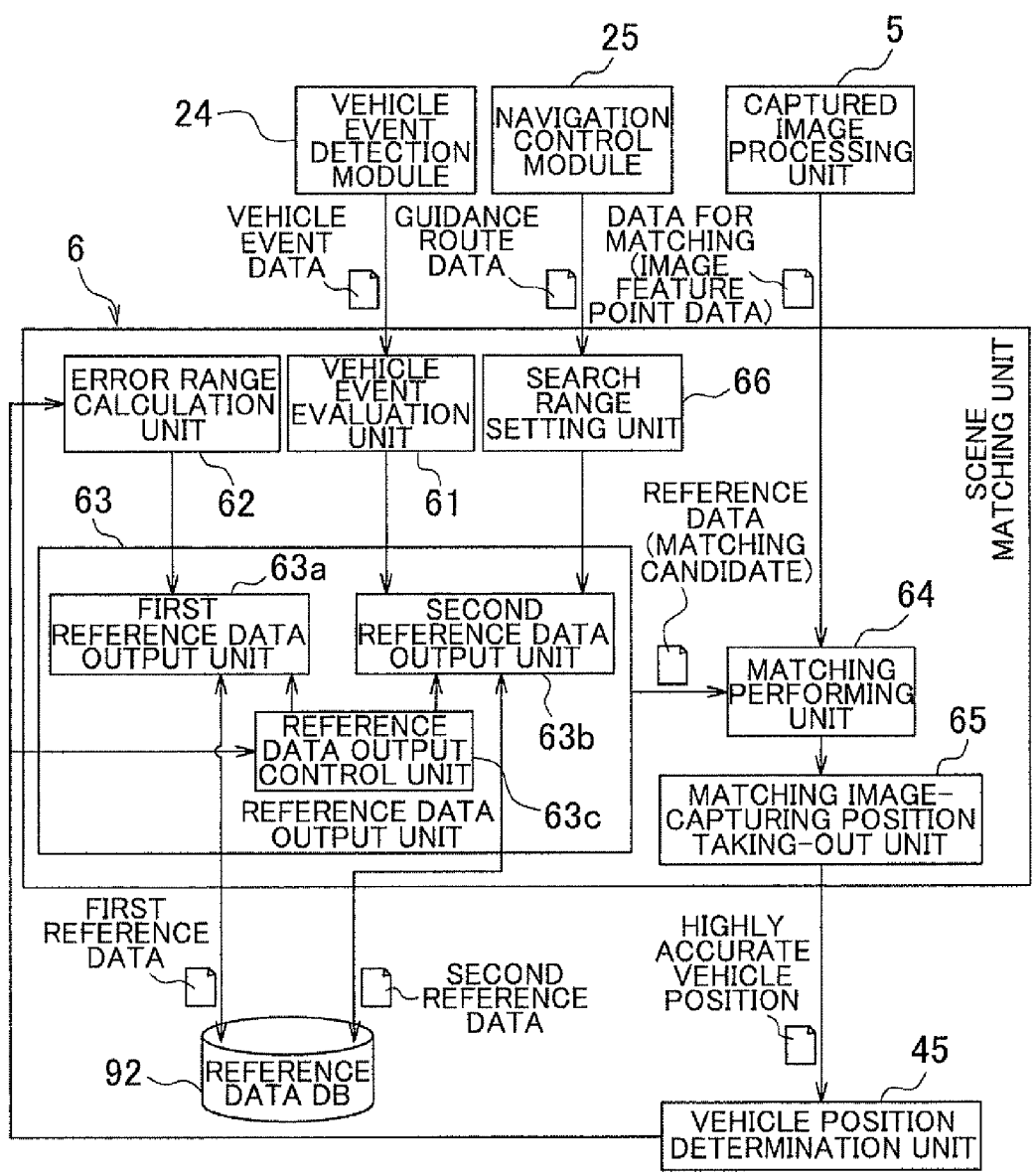
FIG. 7 is a functional block diagram showing functions of a scene matching unit.

FIG. 7 is a functional block diagram used for explaining functional units of the scene matching unit 6 that performs the scenic image recognition between the reference data (the first reference data and the second reference data) output using both of the above-described error range and the above-described actual vehicle event, and the data for matching generated from the captured image. The scene matching unit 6 includes a vehicle event evaluation unit 61, an error range calculation unit 62, a reference data output unit 63, a matching performing unit 64, a matching image-capturing position taking-out unit 65, and a search range setting unit 66.

The vehicle event evaluation unit 61 evaluates the vehicle event transmitted from the vehicle event detection module 24, and outputs the vehicle event information. The event value in the actual vehicle event, such as the vehicle speed or the steering angle, is recorded in the vehicle event information in such a format that the event value in the actual vehicle event can be compared with the event value in the recorded vehicle event associated with the reference data. The error range calculation unit 62 calculates the error range based on the estimated vehicle position, taking into account the error in the estimated vehicle position. The reference data output unit 63 includes a first reference data output unit 63a, a second reference data output unit 63b, and a reference data output control unit 63c that controls the operations of the two reference data output units 63a and 63b. The first reference data output unit 63a sets the search condition for extracting the suitable matching candidates for the data for matching generated by the captured image processing unit 5, based on the error range transmitted from the error range calculation unit 62, and extracts the first reference data that serve as the basic matching candidates. The second reference data output unit 63b sets the search condition based on the event value in the actual vehicle event recorded in the vehicle event information transmitted from the vehicle event evaluation unit 61, and a limit range transmitted from the search range setting unit 66, and extracts the second reference data that serve(s) as the additional matching candidate(s). The search range setting unit 66 sets the limit range and transmits the limit range to the second reference data output unit 63*b*. The limit range is set to a range determined based on a range over which the vehicle has traveled from a starting point, using travel history data such as guidance route data obtained from the navigation control module 25. The starting point is the vehicle position obtained when the reference data matched the data for matching in previous matching. For example, the limit range is set to a range that is twice as large as the range over which the vehicle has traveled from the starting point. The search range setting unit 66 sets other given limit range(s) that limit(s) the search range, and transmits the other limit range(s) to the second reference data output unit 63*b*. The reference data output control unit 63*c* may control the operations of the first reference data output unit 63*a* and the second reference data output unit 63*b* in various modes, such as a mode in which priority is basically given to the extraction of the first reference data by the first reference data output unit 63*a*, and when no extracted first reference data matches the data for matching, the second reference data output unit 63*b* extracts the second reference data, and a mode in which priority is basically given to the extraction of the second reference data by the second reference data output unit 63*b*. The mode may be selected from among the various modes, in accordance with the reliability degree of the estimated vehicle position. In the embodiment, each of the first reference data output unit 63*a* and the second reference data output unit 63*b* is configured to extract the reference data whose image-capturing position is included in the reference data extraction range defined as the range of positions. A reference data extraction range for the second reference data output unit 63*b* is set to be larger than a reference data extraction range for the first reference data output unit 63*a*. The center of the reference data extraction range for the first reference data output unit 63*a* is the estimated vehicle position.

The matching performing unit 64 performs the pattern matching on the data for matching, while sequentially setting each reference data included in the extracted reference dataset as the pattern. When the reference data matches the data for matching, the matching image-capturing position taking-out unit 65 retrieves the image-capturing position (the vehicle position) associated with the reference data that matches the data for matching, and transmits the retrieved image-capturing position to the vehicle position determination unit 45 as the highly accurate vehicle position.

In the field of car navigation, when a vehicle position is estimated by measuring position coordinates using electric navigation or dead reckoning navigation, an error occurs. Therefore, it is considered that an actual vehicle position (at which a vehicle is actually located) exists in a region with a predetermined radius, which is set based on the estimated vehicle position. The region with the predetermined radius is referred to as an estimated error range. The estimated error range is an example of a range that serves as an extraction condition for extracting the reference data, and that is a range of image-capturing positions in the vicinity of the estimated vehicle position. Further, on the condition that the vehicle exists on a road or a place equivalent to a road, for example, the region with the predetermined radius can be reduced to a region with a shape that extends along the road. The reduced region with the above-described shape is also an example of the estimated error range.

Various events that occur in the vehicle during travel, and various events that are caused to operate the vehicle during travel may be used as the vehicle event. However, because the vehicle event in the invention is used to determine the position on a road on which the vehicle is traveling, it is preferable to use an event that occurs in the vehicle in relation to the road, or an event that is caused in the vehicle in relation to the road, as the vehicle event. The vehicle event includes a vehicle behavior caused by a specific traveling state of the vehicle on a road, such as traveling on a curved road, temporary stop during travel, and a traveling on a slope road. It is particularly preferable to use the stop of the vehicle as the vehicle event. The stop of the vehicle is easily detected by a distance sensor or the like, and the stop of the vehicle is related with an intersection, a railroad crossing, or a pedestrian crossing. Therefore, the reference data extracted based on the stop of the vehicle may be regarded as a valuable matching candidate. Further, it is preferable to use detection of a specific road marking on a road on which the vehicle is traveling, as a characteristic vehicle event.

The second reference data is extracted by the second reference data output unit 63*b*, in order to supplement the reference data extracted by the first reference data output unit 63*a*. Therefore, each of the first reference data output unit 63*a* and the second reference data output unit 63*b* may be configured to extract the reference data whose image-capturing position is included in the reference data extraction range defined as a range of positions. It is preferable that the reference data extraction range for the first reference data output unit 63*a* may be set so that the center of the reference data extraction range for the first reference data output unit 63*a* is the estimated vehicle position, and the reference data extraction range for the second reference data output unit 63*b* may be set to be larger than the reference data extraction range for the first reference data output unit 63*a*. This makes it possible to extract the reference data whose image-capturing position is located outside the reference data extraction range for the first reference data output unit 63*a*, and which is useful as the matching candidate.

In the above-described embodiment, the processing of extracting the first reference data is performed by the first reference data output unit 63*a*, in preference to the processing of extracting the second reference data, which is performed by the second reference data output unit 63*b*. When a certain accuracy of the estimated vehicle position is ensured, there is a high probability that the first reference data matches the data for matching. Therefore, it is preferable to employ the configuration in the above-described embodiment.

However, when it is expected that the accuracy of the estimated vehicle position is not high, or when the recognized vehicle event is highly dependent on a specific image-capturing position, it is preferable that the processing of extracting the second reference data may be performed by the second reference data output unit 63*b*, in preference to the processing of extracting the first reference data, which is performed by the first reference data output unit 63*a*. With this configuration, it is possible to increase the possibility that the reference data extracted as the matching candidate matches the data for matching. Further, the configuration may be such that a function of evaluating the reliability degree of the estimated vehicle position is provided, and it is determined which of the extraction processing performed by the first reference data output unit 63*a* and the extraction processing performed by the second reference data output unit 63*b* may be given priority, according to the reliability degree.

There should be a plurality of the reference data that are associated with the same vehicle event and different image-capturing positions. Therefore, the search range needs to be limited. When the vehicle position, which is obtained when the reference data matches the data for matching in previous matching, is regarded as having no error, it is considered that the error in the estimated vehicle position increases when the vehicle slips or the vehicle travels in a zigzag line afterward. Therefore, in a preferred embodiment, the reference data extraction range for the second reference data output unit 63b is set to a range determined based on a range over which the vehicle has traveled from a starting point. The starting point is the vehicle position obtained when the first reference data output by the first reference data output unit 63a matched the data for matching.

In the above-described embodiment, among the edge points obtained as the image feature points through the edge detection processing, particularly, the line segment edge points (the straight line component edge points) that constitute one line segment, and the corner edge point (the intersection edge point) are treated as the useful image feature points. The corner edge point (the intersection edge point) corresponds to the intersection at which the line segments intersect with each other, preferably, the line segments are substantially orthogonal to each other. The matching performing unit 64 employs an algorithm for ordinary pattern matching. However, the matching performing unit 64 may employ an algorithm for weighted pattern matching in which when the corner edge points, which have a high importance degree in the scenic image, match each other, a high matching evaluation is provided as compared to when the other edge points match each other (i.e., when the edge points, which are not the corner edge points, match each other). In this case, it is preferable that the reference data DB 92 may be created using the reference data including a corner attribute that shows the coordinates of the corner edge point. Alternatively, the corner edge point may be detected each time the reference data is extracted. During the process of generating the data for matching from the actually-captured image, an identification label may be assigned to the corner edge point in the data for matching.

The image feature points used in the invention are not limited to the line segment edge point and the corner edge point. The image feature points useful for a scene may be used. For example, the typical edge points that form a geometric shape, such as a circle and a rectangle, may be used (when the geometric shape is a circle, the typical edge points may be three points on the circumference of the circle), or the gravity center of a geometric shape or a point indicating the gravity center of the geometric shape in the image may be used. Also, it is preferable to employ an edge intensity as a factor used for calculating the importance degree. For example, when a line segment is composed of an edge with a high intensity, the starting point and the ending point of the line segment may be treated as the image feature points to which a high importance degree is assigned, as compared to an importance degree assigned to the edge points other than the starting point and the ending point. Also, specific points in a characteristic geometric shape, for example, end points in a symmetrical object may be treated as the image feature points to which a high importance degree is assigned, as compared to an importance degree assigned to the edge points other than the end points.

Further, in addition to the edge points obtained through the edge detection processing, a point at which a hue and/or a chroma greatly change(s) in the captured image may be employed as the image feature point. Similarly, as the image feature point based on color information, the end point of an object with a high color temperature may be treated as the image feature point with a high importance degree.

That is, any image feature points may be used in the embodiment of the invention, as long as the image feature points are useful for the determination as to the degree of similarity between the reference data and the image feature point data generated based on the actually-captured image, for example, the pattern matching.

In the above-described embodiment, the reference data stored in the reference data DB 92 is associated with the image-capturing position and the image-capturing direction (the direction of the optical axis of the camera). The reference data may be associated with the above-described image-capturing situation information, a date on which the image is captured, a weather at the time of image capturing, and the like, in addition to the image-capturing position and the image-capturing direction.

The image-capturing position needs to be indicated by at least two-dimensional data such as data including the latitude and the longitude. The image-capturing position may be indicated by three-dimensional data including the latitude, the longitude, and the altitude.

The image-capturing direction does not necessarily need to be associated with the reference data. For example, in the case where it is ensured that when the reference data is created, the image is captured in a direction with respect to a road on which the vehicle is traveling, which is substantially the same as a direction in which the image is captured when the scenic image recognition is performed using the reference data, the image-capturing direction does not need to be associated with the reference data.

In the case where the image-capturing direction is associated with the reference data, and a plurality of reference data may be prepared by appropriately changing the image-capturing direction from one basic image-capturing direction, the direction in which the vehicle is traveling may be calculated based on information transmitted from the direction sensor and the like, and only the reference data, whose image-capturing direction coincides with the direction in which the vehicle is traveling, may be used for the scenic image recognition. Thus, when the image-capturing attribute information includes the image-capturing direction as described above, it is possible to reduce the amount of the reference data used for the matching, by specifying the image-capturing direction.

The most appropriate vehicle-mounted camera used in the embodiment of the invention is a camera that captures an image of a scene ahead of the vehicle in the direction in which the vehicle is traveling. However, the vehicle-mounted camera may be a camera that captures an image of a scene at a position obliquely ahead of the vehicle, or an image of a scene behind the vehicle. When using a rear camera that captures an image of a scene behind the vehicle, a direction in which the image feature points move during travel of the vehicle is opposite to a direction in which the image feature points move during travel of the vehicle when using a front camera. Therefore, when the image feature points are concentrated on a peripheral area, a reference point is offset forward, instead of offsetting the reference point rearward. When the image feature points are concentrated on a center area, the reference point is offset rearward, instead of offsetting the reference point forward. That is, because each of the front camera and the rear camera may be used, the captured image used in the invention is not limited to the captured image obtained by capturing an image of a scene ahead of the vehicle in the vehicle traveling direction.

In the functional block diagram used to describe the above embodiment, the functional units are separated from each other so that the description is easily understandable. However, the invention is not limited to the case where the functional units are separated from each other as shown in the functional block diagram. At least two of the functional units may be freely combined with each other, and/or one functional unit may be further divided.

The image processing system according to the embodiment of the invention may be applied not only to car navigation, but also to a technical field in which the current position and the current direction are measured through the scenic image recognition.

What is claimed is:

1. A vehicle position detection system comprising:
a reference data database in which reference data is stored, wherein the reference data is generated by associating image feature point data generated by extracting image feature points from a captured image obtained by capturing a scene viewed from a vehicle, with an image-capturing position at which an image is captured to obtain the captured image corresponding to the image feature point data, and a recorded vehicle event that indicates a vehicle event at when the image is captured to obtain the captured image;
a captured image processing unit to which an actually-captured image is input, and which outputs data for matching generated by extracting image feature points from the actually-captured image, wherein the actually-captured image is obtained by capturing an image of a scene using a vehicle-mounted camera;
a vehicle event evaluation unit that generates information on an actual vehicle event that is a vehicle event detected by the vehicle;
a first reference data output unit that extracts first reference data whose image-capturing position is located in a vicinity of an estimated position of the vehicle, from among a set of the reference data stored in the reference data database, based on the estimated position of the vehicle, and outputs the extracted first reference data as a matching candidate for the data for matching;
a second reference data output unit that extracts second reference data that includes the recorded vehicle event that matches the actual vehicle event, from among the set of the reference data stored in the reference data database, based on the vehicle event, and outputs the extracted second reference data as the matching candidate for the data for matching, an extraction preference being set so that the extracting of the first reference data by the first reference data output unit is performed in preference to the extracting of the second reference data by the second reference data output unit;
a matching performing unit that:
 performs matching between the first reference data and the data for matching to determine whether the first reference data matches the data for matching; and
 when the first reference data does not match the data for matching, performs matching between the second reference data and the data for matching to determine whether the second reference data matches the data for matching; and
a vehicle position determination unit that determines a position of the vehicle, based on the image-capturing position associated with the one of the first reference data or the second reference data that is determined to match the data for matching.

2. The vehicle position detection system according to claim 1, wherein
each of the first reference data output unit and the second reference data output unit is configured to extract the reference data whose image-capturing position is included in a reference data extraction range that is defined as a range of positions;
the reference data extraction range for the first reference data output unit is set so that a center of the reference data extraction range for the first reference data output unit is the estimated position of the vehicle; and
the reference data extraction range for the second reference data output unit is set to be larger than the reference data extraction range for the first reference data output unit.

3. The vehicle position detection system according to claim 1, wherein
when it is expected that the accuracy of the estimated vehicle position is not high, or when the detected vehicle event is highly dependent on a specific image-capturing position, the extraction preference is reversed so that the extracting the second reference data by the second reference data output unit is performed in preference to the extracting the first reference data by the first reference data output unit.

4. The vehicle position detection system according to claim 2, wherein
the reference data extraction range for the second reference data output unit is set to a range determined based on a range over which the vehicle has traveled from a starting point, wherein the starting point is a position of the vehicle obtained when the first reference data output by the first reference data output unit matched the data for matching.

5. The vehicle position detection system according to claim 1, wherein
the vehicle event includes a vehicle behavior caused by a specific traveling state of the vehicle on a road.

6. The vehicle position detection system according to claim 1, wherein
the vehicle event includes detection of a specific road marking on a road on which the vehicle is traveling.

* * * * *